United States Patent
Nayak (10) Patent No.: US 11,690,040 B2
(45) Date of Patent: Jun. 27, 2023

(54) METHOD, APPARATUS AND COMPUTER PROGRAM

(71) Applicant: NOKIA TECHNOLOGIES OY, Espoo (FI)

(72) Inventor: Ashok Kumar Nayak, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/291,883

(22) PCT Filed: Nov. 9, 2018

(86) PCT No.: PCT/EP2018/080805
§ 371 (c)(1),
(2) Date: May 6, 2021

(87) PCT Pub. No.: WO2020/094241
PCT Pub. Date: May 14, 2020

(65) Prior Publication Data
US 2021/0410095 A1  Dec. 30, 2021

(51) Int. Cl.
*H04W 60/04* (2009.01)
*H04M 3/533* (2006.01)

(52) U.S. Cl.
CPC ........... *H04W 60/04* (2013.01); *H04M 3/533* (2013.01)

(58) Field of Classification Search
CPC ... H04W 60/04; H04M 3/533; H04L 65/1073; H04L 65/1016; H04L 65/1006
See application file for complete search history.

(56) References Cited

U.S. PATENT DOCUMENTS

| | | | | |
|---|---|---|---|---|
| 2004/0153667 A1* | 8/2004 | Kastelewicz | ......... | H04W 12/06 726/9 |
| 2009/0070469 A1* | 3/2009 | Roach | ..................... | H04W 4/16 709/227 |
| 2009/0210743 A1* | 8/2009 | Gu | ...................... | H04L 65/1016 709/221 |
| 2010/0062767 A1* | 3/2010 | Leis | .................... | H04L 65/1016 455/435.1 |
| 2010/0293261 A1* | 11/2010 | Belinchon | ............... | H04L 69/40 709/223 |

(Continued)

FOREIGN PATENT DOCUMENTS

CN  102934415  2/2013
WO  WO 2015/007310 A1  1/2015

OTHER PUBLICATIONS

"3rd Generation Partnership Project; Technical Specification Group Core Network and Terminals; IMS Restoration Procedures (Release 12)", 3GPP TS 23.380 v12.4.0 (Sep. 2016), 30 pages.

(Continued)

*Primary Examiner* — Minjung Kim
(74) *Attorney, Agent, or Firm* — Alston & Bird LLP (57) ABSTRACT

An apparatus (308) comprising means for: receiving, from a second user equipment (312), a request for communication with a first user equipment (302), after a period of time during which the apparatus was not operating; receiving information from a home subscriber server (310) comprising an expiry value for registration of the first user equipment with the apparatus; and determining that the registration has expired.

19 Claims, 6 Drawing Sheets

(56) References Cited

U.S. PATENT DOCUMENTS

| | | | |
|---|---|---|---|
| 2014/0018039 A1* | 1/2014 | Lau | H04W 8/20 |
| | | | 455/411 |
| 2015/0124588 A1 | 5/2015 | Hallenstal et al. | |
| 2015/0181513 A1* | 6/2015 | Sharma | H04W 88/06 |
| | | | 370/328 |
| 2015/0312387 A1 | 10/2015 | Merino Vazquez et al. | |
| 2018/0007612 A1 | 1/2018 | Jahangir et al. | |
| 2018/0132291 A1 | 5/2018 | Kalepu et al. | |

OTHER PUBLICATIONS

"3rd Generation Partnership Project; Technical Specification Group Core Network and Terminals; IP Multimedia (IM) Subsystem Cx and Dx Interfaces; Signalling Flows and Message Contents (Release 15)", 3GPP TS 29.228 v15.1.0, (Sep. 2018), 82 pages.

"HSS-Based P-CSCF Restoration", Cisco Configuration Guides, MME Administration Guide, StarOS Release 20, (Aug. 8, 2016), 8 pages.

International Search Report and Written Opinion for Patent Cooperation Treaty Application No. PCT/EP2018/080805 dated May 16, 2019, 12 pages.

Office Action for Chinese Application No. 201880099375.4 dated Oct. 11, 2022, 16 pages.

\* cited by examiner

METHOD, APPARATUS AND COMPUTER PROGRAM

CROSS-REFERENCE TO RELATED APPLICATIONS

This application is a national phase entry of International Application No. PCT/EP2018/080805, filed Nov. 9, 2018, the entire contents of which are incorporated herein by reference.

TECHNICAL FIELD

Various examples relate to a method, apparatus and a computer program. More particularly, various examples relate to communications involving a serving call state control function.

BACKGROUND

A user equipment (UE) may register with an IP (Internet Protocol) Multimedia Subsystem (IMS). In some cases a UE will not re-register.

SUMMARY

According to a first aspect, there is provided an apparatus comprising means for: receiving, from a second user equipment, a request for communication with a first user equipment, after a period of time during which the apparatus was not operating; receiving information from a home subscriber server comprising an expiry value for registration of the first user equipment with the apparatus; and determining that the registration has expired.

According to an example, determining that the registration has expired comprises comparing a current time with the expiry value and determining that the registration has expired when the current time is determined to be later than the expiry value.

According to an example, the means are further configured to: send a request message to the home subscription server; and in response, receive the information from the home subscriber server.

According to an example, the means are further configured to: receive a registration request from the first user equipment, and in response: send a server assignment request message for the first user equipment to the home subscription server.

According to an example, the registration request from the first user equipment is an initial registration.

According to an example, the registration request from the first user equipment is a re-registration.

According to an example, the server assignment request message comprises the expiry value.

According to an example, the server assignment request message is sent before the period of time during which the apparatus was not operating.

According to an example, the means are further configured to: provide a default service when it is determined that the registration has expired.

According to an example, the default service comprises forwarding communication data to a voice mail service or to a third user equipment.

According to an example, the default service comprises redirecting the requested communication to a circuit switched domain.

According to an example, the request for communication with the first user equipment is an invite for an incoming call.

According to an example, the apparatus is a serving call session control function.

According to a second aspect there is provided an apparatus comprising at least one processor; and at least one memory including computer program code; the at least one memory and the computer program code configured to, with the at least one processor, cause the apparatus at least to perform; receiving, from a second user equipment, a request for communication with a first user equipment, after a period of time during which the apparatus was not operating; receiving information from a home subscriber server comprising an expiry value for registration of the first user equipment with the apparatus; and determining that the registration has expired.

According to an example, determining that the registration has expired comprises comparing a current time with the expiry value and determining that the registration has expired when the current time is determined to be later than the expiry value.

According to an example, the at least one memory and the computer program code are configured to, with the at least one processor, cause the apparatus at least to perform: sending a request message to the home subscription server; and in response, receive the information from the home subscriber server.

According to an example, the at least one memory and the computer program code are configured to, with the at least one processor, cause the apparatus at least to perform: receiving a registration request from the first user equipment, and in response: send a server assignment request message for the first user equipment to the home subscription server.

According to an example, the registration request from the first user equipment is an initial registration.

According to an example, the registration request from the first user equipment is a re-registration.

According to an example, the server assignment request message comprises the expiry value.

According to an example, the server assignment request message is sent before the period of time during which the apparatus was not operating.

According to an example, the at least one memory and the computer program code are configured to, with the at least one processor, cause the apparatus at least to perform: providing a default service when it is determined that the registration has expired.

According to an example, the default service comprises forwarding communication data to a voice mail service or to a third user equipment.

According to an example, the default service comprises redirecting the requested communication to a circuit switched domain.

According to an example, the request for communication with the first user equipment is an invite for an incoming call.

According to an example, the apparatus is a serving call session control function.

According to a third aspect there is provided an apparatus comprising: receiving circuitry for receiving, from a second user equipment, a request for communication with a first user equipment, after a period of time during which the apparatus was not operating; receiving circuitry for receiving information from a home subscriber server comprising an expiry value for registration of the first user equipment with the apparatus; and determining circuitry for determining that the registration has expired.

According to a fourth aspect there is provided a method comprising: receiving, at an apparatus and from a second user equipment, a request for communication with a first user equipment, after a period of time during which the apparatus was not operating; receiving information from a home subscriber server comprising an expiry value for registration of the first user equipment with the apparatus; and determining that the registration has expired.

According to an example, determining that the registration has expired comprises comparing a current time with the expiry value and determining that the registration has expired when the current time is determined to be later than the expiry value.

According to an example, the method comprises sending a request message to the home subscription server; and in response, receiving the information from the home subscriber server.

According to an example, the method comprises: receiving a registration request from the first user equipment, and in response: sending a server assignment request message for the first user equipment to the home subscription server.

According to an example, the registration request from the first user equipment is an initial registration.

According to an example, the registration request from the first user equipment is a re-registration.

According to an example the server assignment request message comprises the expiry value.

According to an example, the server assignment request message is sent before the period of time during which the apparatus was not operating.

According to an example, the method comprises: providing a default service when it is determined that the registration has expired.

According to an example, providing the default service comprises forwarding communication data to a voice mail service or to a third user equipment.

According to an example, providing the default service comprises redirecting the requested communication to a circuit switched domain.

According to an example, the request for communication with the first user equipment is an invite for an incoming call.

According to an example, the apparatus is a serving call session control function.

According to a fifth aspect there is provided a computer program comprising instructions for causing an apparatus to perform at least the following: receiving, from a second user equipment, a request for communication with a first user equipment, after a period of time during which the apparatus was not operating; receiving information from a home subscriber server comprising an expiry value for registration of the first user equipment with the apparatus; and determining that the registration has expired.

According to a sixth aspect there is provided a computer program comprising instructions stored thereon for performing at least the following: receiving, at an apparatus and from a second user equipment, a request for communication with a first user equipment, after a period of time during which the apparatus was not operating; receiving information from a home subscriber server comprising an expiry value for registration of the first user equipment with the apparatus; and determining that the registration has expired.

According to a seventh aspect there is provided a non-transitory computer readable medium comprising program instructions for causing an apparatus to perform at least the following: receiving, from a second user equipment, a request for communication with a first user equipment, after a period of time during which the apparatus was not operating; and receiving information from a home subscriber server comprising an expiry value for registration of the first user equipment with the apparatus; and determining that the registration has expired.

According to an eighth aspect there is provided a non-transitory computer readable medium comprising program instructions stored thereon for performing at least the following: receiving, at an apparatus and from a second user equipment, a request for communication with a first user equipment, after a period of time during which the apparatus was not operating; receiving information from a home subscriber server comprising an expiry value for registration of the first user equipment with the apparatus; and determining that the registration has expired.

In the above, various aspects have been described. It should be appreciated that further aspects may be provided by the combination of any two or more of the aspects described above.

Various other aspects and further embodiments are also described in the following detailed description and in the attached claims.

BRIEF DESCRIPTION OF THE DRAWINGS

To assist understanding of the present disclosure and to show how some embodiments may be put into effect, reference is made by way of example only to the accompanying drawings in which.

DETAILED DESCRIPTION

Some examples may be provided in the context of restoration of a Serving-Call Session Control Function (S-CSCF) 108 following a period of failure or inactivity (i.e. following a period when S-CSCF 108 is in a failed or inactive state).

Figure 1:
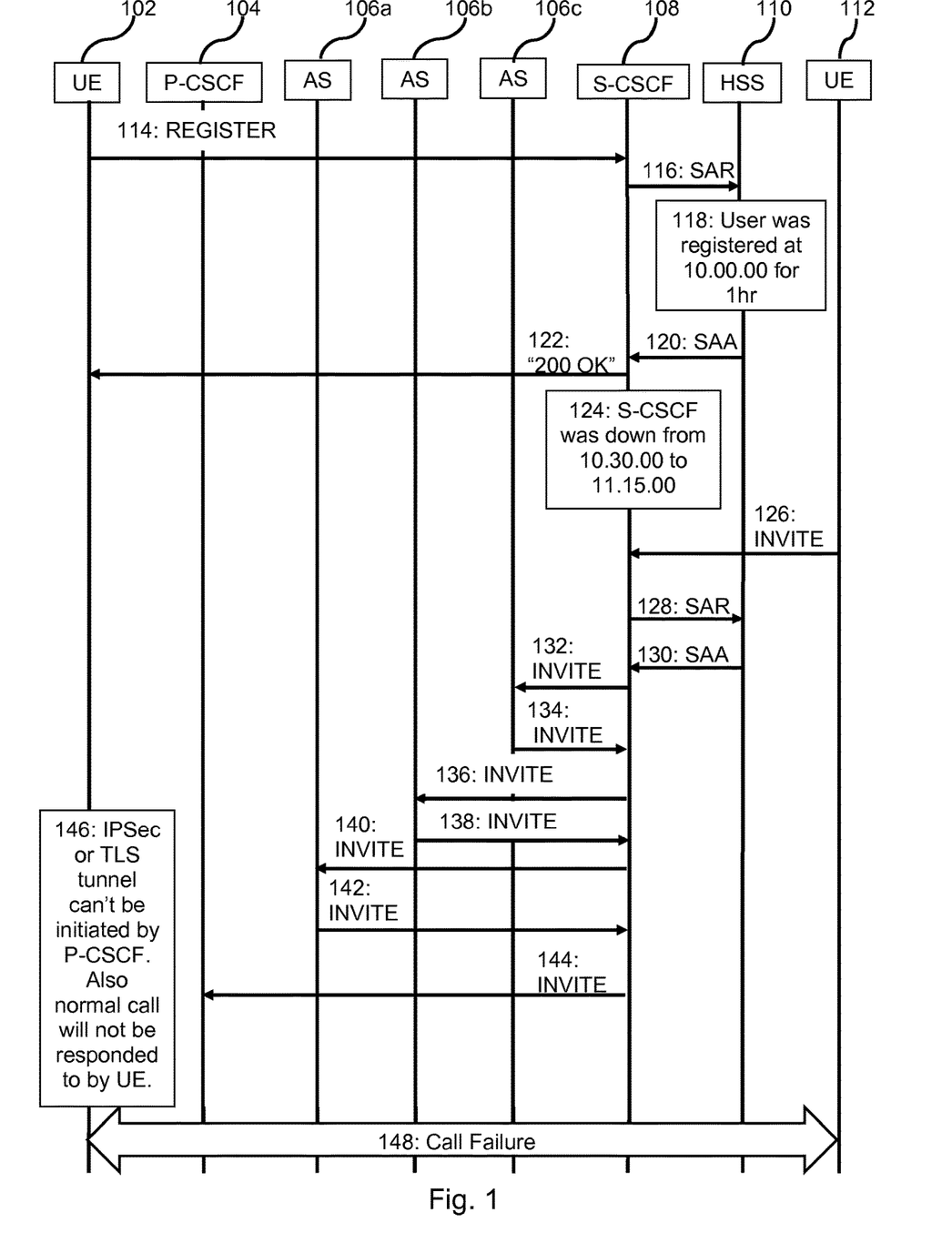
FIG. 1 shows schematically an example of a message flow.

FIG. 1 shows schematically an example message flow that may take place when a user equipment (UE) 102 registers in an IMS. As shown in FIG. 1, information is sent between UE 102, Proxy-Call Session Control Function (P-CSCF), S-CSCF 108, Home Subscription Server (HSS) 110 and UE 112.

At 114, UE 102 sends a register message to S-CSCF 108. In examples, this message is a request to register in an IMS with the S-CSCF 108. The register message may be a request for an initial registration (i.e. a first registration with S-CSCF 108) or a re-registration (i.e. a second or subsequent registration with S-CSCF 108). In response, S-CSCF 108 sends a Server Assignment Request (SAR) to HSS 110 at 116. The SAR message can be used to inform HSS 110 that S-CSCF 108 serves UE 102.

In the example shown at FIG. 1, the SAR message comprises an information field indicating a time period for which UE is registered with S-CSCF 108. In some examples, this time period may be represented by a timestamp at which the registration of UE 102 at S-CSCF 108 begins and a time duration for which the registration lasts. In the example shown in FIG. 1 at 118, UE 102 is registered for 1 hour from 10.00.00 (i.e., the registration lasts until 11.00.00).

In response to receiving the SAR message at 116, HSS 110 sends a Server Assignment Answer (SAA) message to S-CSCF 108 at 120. S-CSCF 108 then sends a 200 OK message (a message comprising the 200 status code) to UE 102 at 122. The 200 OK message indicates to UE 102 that the registration request sent at 114 was received and processed by S-CSCF 108.

In the example shown in FIG. 1, at 124 S-CSCF 108 fails (i.e. is down or is in a failed state) from 10.30.00 to 11.15.00. In this period S-CSCF 108 does not operate.

When S-CSCF 108 restarts (in this example, at 11.15.00), S-CSCF 108 loses registration context. This is because either S-CSCF 108 loses user data or because it is unable to trust data after it resumes operation, due to the fact that it may have lost profile updates from HSS 110 in the service interruption period.

In some examples, a new S-CSCF may be selected while S-CSCF 108 is down according to a failover mechanism. The failover mechanism is discussed further below with respect to FIG. 2.

When S-CSCF 108 is no longer in a failed state, it will restart (in the example shown in FIG. 1, this is at 11.15.00). In the case of a failover, the new S-CSCF, which is different to S-CSCF 108, may carry out the remaining steps performed by S-CSCF 108 in FIG. 1.

In the case of a restart of S-CSCF 108 or failover and re-selection of S-CSCF 108 before an invite is received at 126, S-CSCF 108 proceeds with a restoration procedure for all incoming calls or data sessions for UEs, including those for which registration context is expired. However, UE 102 may no longer be available for the IMS (for example UE 102 may be out of coverage, UE 102 may have battery outage, there may be a failure of UE 102, etc.). In this situation (as shown in FIG. 1) UE 108 has not sent a re-registration request after 11.00.00, but due to the loss of registration context at S-CSCF 108 following the failure period between 10.30.00 and 11.15.00, S-CSCF 108 tries to restore the registration for incoming calls for UE 102.

In an example, the invite received at 126 may be received by a new S-CSCF selected according to a failover mechanism. In examples, this may be during a period in which S-CSCF 108 is still down. In this case the remaining steps performed by S-CSCF 108 following step 126 shown in FIG. 1 may be performed by the new S-CSCF selected according to the failover mechanism.

At 126, S-CSCF 108 receives an incoming call for UE 102 from UE 112. In response, at 128, S-CSCF 108 sends an SAR message for UE 102 to HSS 110 and receives an SAA message from HSS 110 at 130. Steps 128 and 130 may be considered to be a restoration procedure for the registration of UE 102 at S-CSCF 108.

S-CSCF 108 then proceeds to provide a registered service for UE 102. The registered service may comprise executing a terminating service execution, where the S-CSCF tries to place the incoming call or tries to serve the incoming call. This may comprise invoking multiple as such as AS 106*a*, AS 106*b* and AS 106*c* as shown at steps 132, 134, 136, 138, 140 and 142 of FIG. 1.

In examples, the registered service may also comprise forwarding the invite for the incoming call from UE 112 to P-CSCF 104. A call may be a data communication session. This step is shown at 144 of FIG. 1. However, as shown at 146, if the UE is no longer reachable, for example when it no longer has coverage, P-CSCF 104 will not be able to initiate Internet Protocol Security (IPSec) and/or Transport Layer Security (TLS) tunnel. Calls over transport protocol such as user datagram protocol (UDP) and transmission control protocol (TCP) would fail and UE 102 would also not respond to the incoming call. This would therefore lead to call failure, as shown at 148.

When S-CSCF 108 restoration is successful following a restart, S-CSCF 108 may also construct and send a notification, for example a NOTIFY message, to UE 102 for triggering a new registration. After restoration, S-CSCF 108 can construct the restoration context as for normal registration. Following the restart however, S-CSCF 108 does not have adequate information to determine when UE 102 registered and how long it was registered for, and therefore cannot determine the expiry value for the registration. S-CSCF 108 therefore cannot proceed with network initiated deregistration even if the registration for UE 102 has expired.

Figure 2:
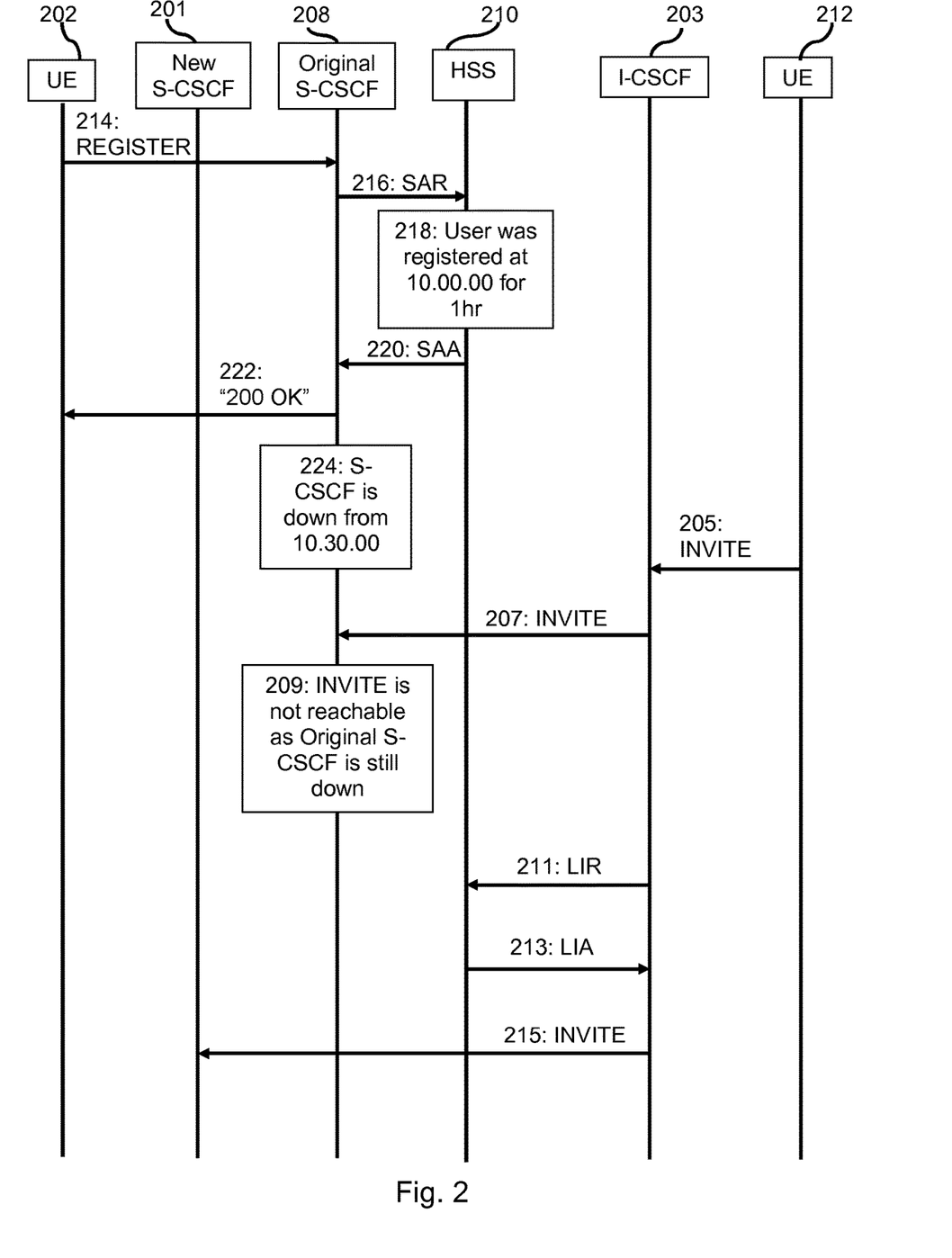
FIG. 2 shows schematically an example of a message flow.

FIG. 2 shows an example message flow that may take place in a situation where a failover takes place between S-CSCF 208 and a new S-CSCF 201. Steps 214, 216, 218, 220 and 222 are similar to steps 114, 116, 118, 120 and 122 discussed above in relation to FIG. 1. In this example, S-CSCF 208 is down for a time period at 224. In the example of FIG. 2, at 224 S-CSCF 208 fails (i.e. is down or is in a failed state) from 10.30.00. During this time period a failover mechanism selects a new S-CSCF 201.

At 205, UE 212 sends an invite to Interrogating Call Session Control Function (I-CSCF) 203. The invite is for a communication session, for example a call, with UE 202. In the example of FIG. 2, the invite is received during a time where S-CSCF 208 is down. At 207, I-CSCF 203 forwards the invite to S-CSCF 208. However, as shown at 209 in FIG. 2, S-CSCF 208 is not reachable as it is still down.

At 211, I-CSCF 211 sends a Location-Info-Request (LIR) message to HSS 210. At 213, I-CSCF 211 sends a Location-Info-Answer (LIA) message to I-CSCF 208. I-CSCF 215 is able to use information comprised in the LIA message to forward the invite to new S-CSCF 201.

Figure 3:
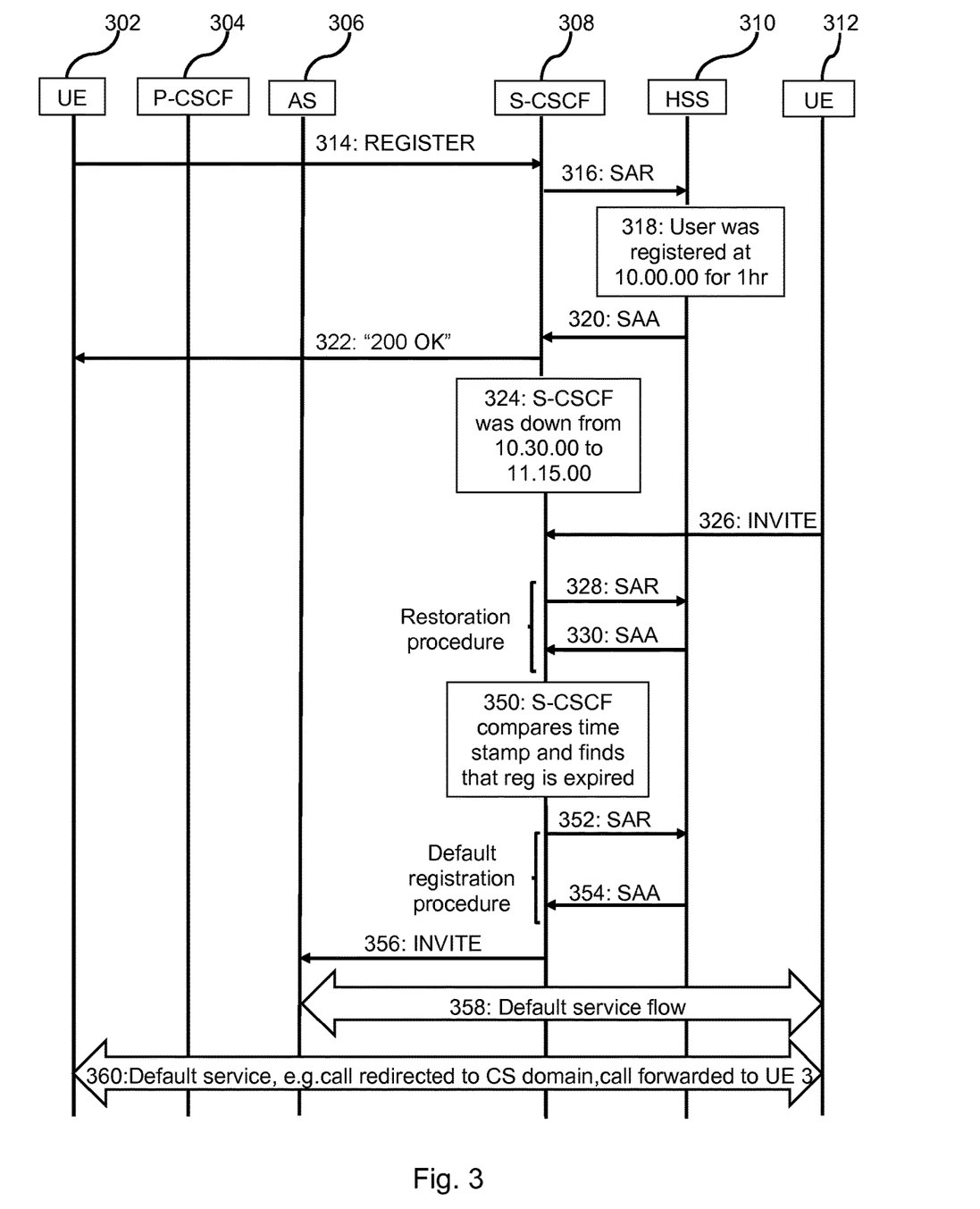
FIG. 3 shows schematically an example of a message flow.

FIG. 3 shows an example message flow between UE 302, Proxy-Call Session Control Function (P-CSCF) 304, one or more Authentication Server(s) (AS) 306, Serving-Call Session Control Function (S-CSCF) 308, Home Subscription Server (HSS) 310 and UE 312. In the example message flow of FIG. 3, S-CSCF 308 is able to identify the registration status of a UE after restoration of S-CSCF 308 is complete following a period in which the S-CSCF is in a failed or inactive state.

At 314, UE 302 sends a register message to S-CSCF 308. The register message may be for an initial registration with S-CSCF 308 or it may be for a re-registration with S-CSCF 308. In examples, this message is a request to register in an IMS. In response, S-CSCF sends a Server Assignment Request (SAR) to HSS 310 at 316. In some examples, the SAR message comprises an expiry time for the registration and a time stamp. The expiry time and time stamp may be stored in a Server-Name attribute-value pair (AVP) of the SAR message. The expiry time and time stamp may be combinable to give an expiry value. During a re-registration of UE 302, S-CSCF 308 will update the expiry value along with the latest time stamp of the re-registration. The expiry value may indicate a time at which registration for a UE ends. In some examples, if a UE is still available after an expiry value, the UE may re-register.

The SAR message can be used to register the UE 302 with HSS 310.

In the example shown at FIG. 3, the SAR message comprises an information field indicating a time period for which UE is registered with S-CSCF 308. In some examples, this time period may be represented by a timestamp at which the registration of UE 302 at S-CSCF 308 begins and a time duration for which the registration lasts. In the example shown in FIG. 3, UE 302 is registered for 1 hour from 10.00.00 (i.e., the registration lasts until 11.00.00).

In response to receiving the SAR message at 316, HSS 310 sends a Server Assignment Answer (SAA) message to S-CSCF 308 at 320. S-CSCF 308 then sends a 200 OK message (a message comprising the 200 status code) to UE 102 at 322. The 200 OK message indicates to UE 302 that the registration request sent at 314 was received and processed by S-CSCF 308.

In the example shown in FIG. 3, as shown at 324 S-CSCF 308 fails (i.e. is down or is in a failed state) from 10.30.00 to 11.15.00. In this period S-CSCF 308 does not operate.

When S-CSCF 308 restarts (in this example, at 11.15.00), S-CSCF 308 loses registration context. This is because either S-CSCF 308 loses user data or because it is unable to trust data after it resumes operation, due to the fact that it may have lost profile updates from HSS 310 in the service interruption period.

In some examples, a new S-CSCF may be selected while S-CSCF 308 is down according to a failover mechanism as described above with respect to FIG. 2.

When S-CSCF 308 is no longer in a failed state, (i.e. is no longer down) it will restart (in the example shown in FIG. 1, this is at 11.15.00). In the case of a failover, S-CSCF 308 is reselected when S-CSCF 308 is no longer down.

In the case of a restart of S-CSCF 308 or failover and re-selection of S-CSCF 308 before an invite is received at 326, S-CSCF 308 proceeds with a restoration procedure for all incoming calls or data sessions for UEs, including those for which registration context is expired. However, UE 302 may no longer be available for the IMS (for example it may be out of coverage). In this situation (as shown in FIG. 1) UE 308 has not sent a re-registration request after 11.00.00, but due to the loss of registration context at S-CSCF 308 following the failure period between 10.30.00 and 11.15.00, S-CSCF 308 tries to restore the registration for incoming calls for UE 302. At 326, S-CSCF 308 receives an incoming call for UE 302 from UE 312.

In examples, S-CSCF 308 then checks registration context for the IMS Public User Identity (IMPU) of UE 312. If S-CSCF 308 cannot find registration context for the IMPU then it continues to step 328.

In an example, the invite received at 326 may be received by a new S-CSCF selected according to a failover mechanism. In examples, this may be during a period in which S-CSCF 308 is still down. In this case the remaining steps performed by S-CSCF 308 following step 326 shown in FIG. 3 may be performed by the new S-CSCF selected according to the failover mechanism. An exemplary method in which the invite may be received by the new S-CSCF is shown in FIG. 2. At step 328, S-CSCF 308 (or the new S-CSCF selected according to the failover mechanism) sends an SAR message to HSS 310. In response, HSS 310 sends an SAA message to S-CSCF 308 at 330. The SAA message comprises a stored time stamp and expiry value for the registration of UE 302 at I-CSCF 308. This may be the same time stamp and expiry time registered at step 318 of FIG. 3.

At 350, S-CSCF 308 (or the new S-CSCF selected according to the failover mechanism) compares the received expiry value with a current time stamp. The current time stamp may relate to the time at which the comparison is made, and in some examples the current time stamp may relate to the time at which the comparison begins. If the S-CSCF determines that the current time stamp is beyond the expiry value (i.e. is later than the expiry value) then the S-CSCF can determine that registration for UE 302 has expired.

S-CSCF 308 (or the newly selected S-CSCF) can send a message to UE 302 for triggering a new registration. In some examples, this may be a "NOTIFY" message.

In some examples, upon determination that registration of UE 302 has expired, S-CSCF 308, or the new S-CSCF selected according to the failover mechanism, can proceed with a default registration procedure. This default registration procedure registers UE 302 as requiring a default service to be provided for incoming calls. This default registration procedure may also register UE 302 with a specific AS, which for example may be AS 306 as shown in FIG. 3. The default registration procedure is shown at 352 and 354 of FIG. 3, where an SAR message is sent from the S-CSCF to HSS 310 at 352 and a SAA message is sent from HSS 310 to the S-CSCF at 354.

Following the default registration procedure, at 356 S-CSCF 308 or the new S-CSCF selected according to the failover mechanism forwards the incoming call for UE 302 to AS 306 to provide a default service flow for UE 312. This can prevent terminating call failure. This can be performed alternatively to attempting to provide a registered service, as shown in FIG. 1.

At 358, a default service flow may be provided between UE 312 and AS 306. At 360, a default service may also be provided between UE 312 and UE 302.

A default service may comprise redirecting a call to the Circuit Switched (CS) domain. In some examples, a default service may comprise forwarding a call to a UE other than UE 302 or UE 312. In some examples, a default service may comprise providing a voicemail service. AS 306 may provide the voicemail service, and in some examples AS 306 may comprise a voicemail server.

Figure 4:
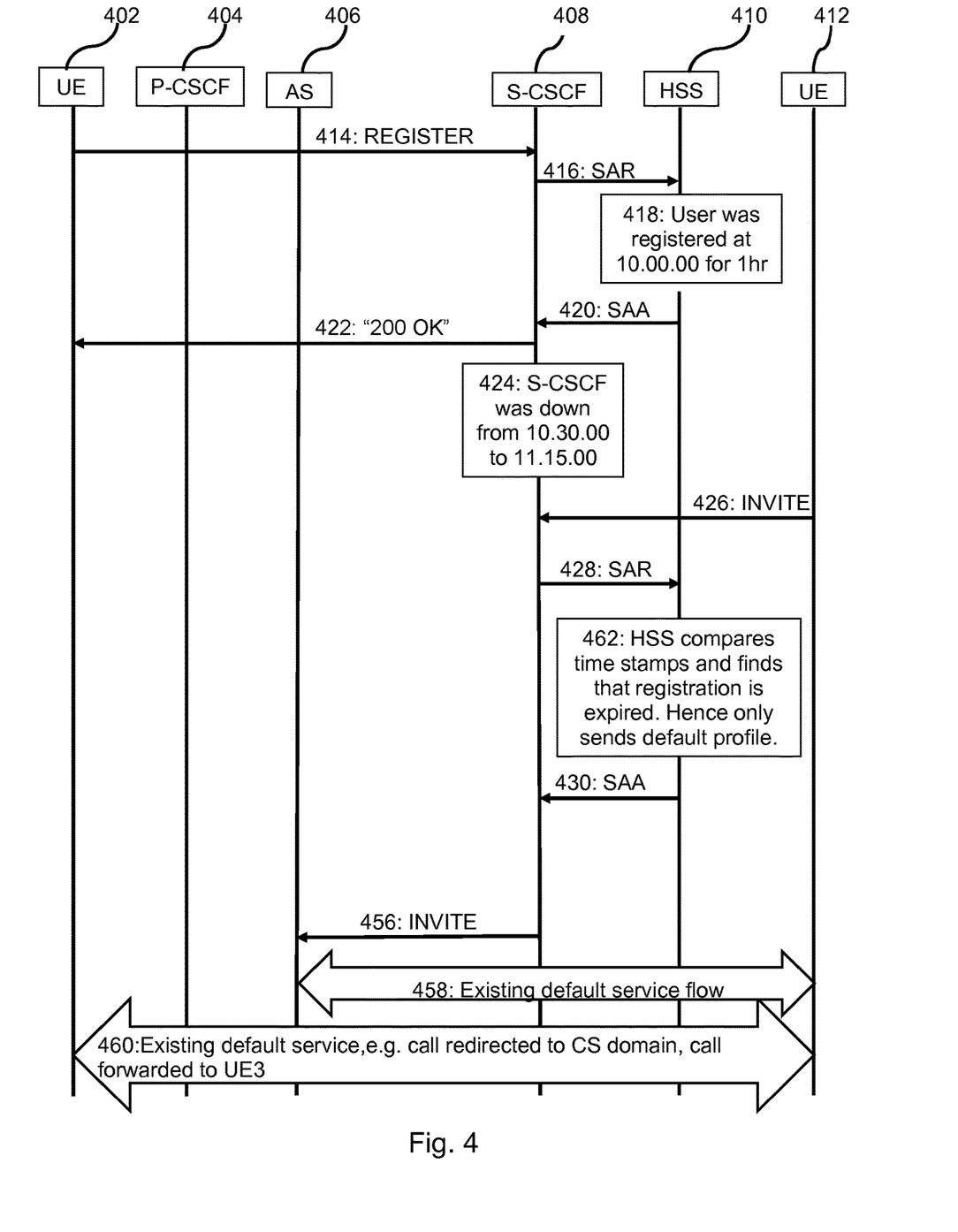
FIG. 4 shows schematically an example of a message flow.

FIG. 4 shows an example message flow between UE 402, Proxy-Call Session Control Function (P-CSCF) 404, one or more Authentication Server(s) (AS) 406, Serving-Call Session Control Function (S-CSCF) 408, Home Subscription Server (HSS) 410 and UE 412. In the example message flow of FIG. 4, S-CSCF 408 and HSS 410 are able to identify the registration status of a UE after restoration of S-CSCF 408 is complete following a period in which S-CSCF 408 is in a failed or inactive state.

Steps 414 to 426 of FIG. 4 are the same as steps 314 to 326 of FIG. 3. For conciseness these steps are not repeated here.

At step 416, during registration, S-CSCF 408 sends an SAR message to HSS 410. In some examples, the SAR message comprises an expiry time for the registration and a time stamp. The expiry time and time stamp may be stored in a Server-Name AVP of the SAR message. The expiry time and time stamp may be combinable to give an expiry value. During a re-registration of UE 402, S-CSCF 408 will update the expiry value along with the latest time stamp of the re-registration.

At 428, S-CSCF 408 sends an SAR message to HSS 410. At 462, HSS 410 compares the current time stamp with the expiry value received in the SAR message sent at 418. The expiry value may be stored at HSS 410. When the current time stamp exceeds the expiry value, HSS 410 determines that registration has expired for the UE for which the restoration procedure has been triggered. In this case, HSS 410 sends a default profile in a SAA message sent at 430. This may comprise HSS 410 sending an SAA with a default value. In some examples, the default value may be "DIAMETER_ERROR_IN_ASSIGNMENT_TYPE_DEFAULT" in the Result-Code AVP.

In response to receiving the default profile, S-CSCF 408 will form a default registration.

Following the default registration procedure, at 456, S-CSCF 408 forwards the incoming call for UE 402 to AS 406 to provide a default service flow for UE. This can be performed alternatively to attempting to provide a registered service as in FIG. 1.

At 460, a default service may also be provided between UE 412 and UE 402.

S-CSCF 408 can send a message to UE 402 for triggering a new registration. In some examples, this may be a "NOTIFY" message.

In some examples, the default service can prevent terminating call failure.

A default service may comprise redirecting a call to the Circuit Switched (CS) domain. In some examples, a default service may comprise forwarding a call to a UE other than UE 402 or UE 412. In some examples, a default service may comprise providing a voicemail service. AS 406 may provide the voicemail service, and in some examples AS 406 may comprise a voicemail server.

Similarly as to FIG. 3, when the invite message from UE 412 is sent during a period where S-CSCF 408 is still down and a failover mechanism such as that shown in FIG. 2 has been implemented, steps 428, 462, 430, 456, 458 and 460 may be carried out by the new S-CSCF selected by the failover mechanism rather than S-CSCF 408.

Figure 5:
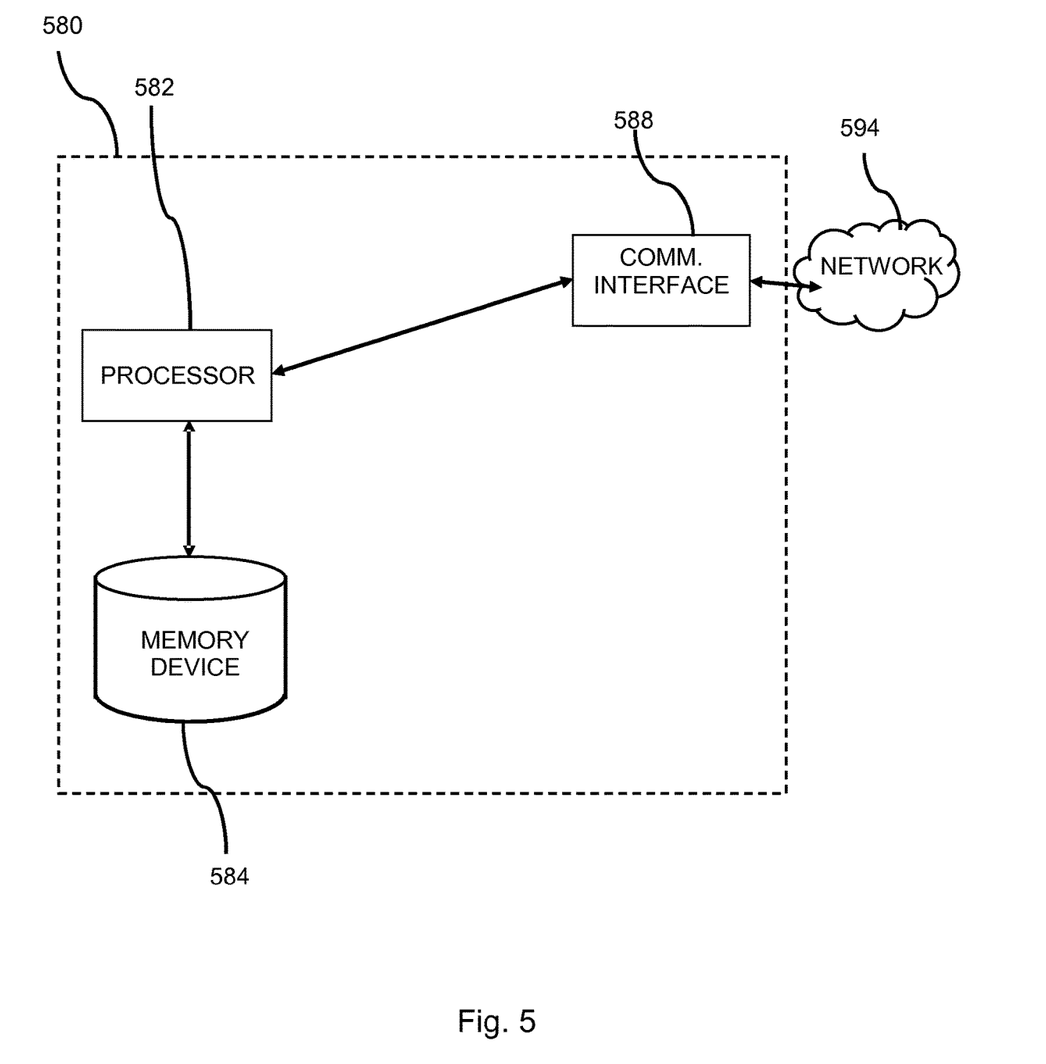
FIG. 5 shows schematically an example of an apparatus.

FIG. 5 shows an example apparatus 580 in which embodiments of the invention may be applied. Apparatus 580 may be an element shown in FIG. 1, 2, 3 or 4. In some example embodiments, the apparatus 580 may, be embodied as, or included as a component of, a communications device with wired or wireless communications capabilities. The example apparatus may include or otherwise be in communication with one or more processors 582, memory devices 584 and/or communications interfaces 588 (in FIG. 5, one of each is shown as an example). Depending on the component of FIG. 1, 2, 3 or 4 being implemented by the apparatus, however, the apparatus may include additional elements and/or may not include one or more of the foregoing elements, such as the user interfaces.

Apparatus 580 may be an apparatus such as S-CSCF 308, S-CSCF 4038, HSS 310 or HSS 410, for example.

The processor 582 may be embodied as various means for implementing the various functionalities of example embodiments of the present invention including, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware.

Whether configured as hardware alone or via instructions stored on a computer-readable storage medium, or by a combination thereof, the processor 582 may be an apparatus configured to perform operations according to embodiments of the present invention while configured accordingly.

Alternatively, in examples where the processor is an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 584 may be one or more computer-readable storage media that may include volatile and/or non-volatile memory. In some example embodiments, the memory device may include Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (for example, hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 582.

Further, the memory device 584 may be configured to store information, data, applications, computer-readable program code instructions, and/or the like for enabling the processor 582 and the example apparatus 580 to carry out various functions in accordance with example embodiments of the present invention described herein. For example, the memory device may be configured to buffer input data for processing by the processor.

The communication interface 588 may be any device or means embodied in hardware, software or a combination of hardware and software that is configured to receive and/or transmit data from/to one or more networks 594 and/or any other device or module in communication with the example apparatus 580.

The communications interface 588 may be configured to provide for communications in accordance with any of a number of wired or wireless communication standards. The communications interface may be configured to support communications in multiple antenna environments, such as multiple input multiple output (MI MO) environments. Further, the communications interface may be configured to support orthogonal frequency division multiplexed (OFDM) signaling. In some example embodiments, the communications interface may be configured to communicate in accordance with various techniques including, as explained above, any of a number of second generation (2G), third generation (3G), fourth generation (4G) or higher generation mobile communication technologies, radio frequency (RF), or any of a number of different wireless networking techniques. The communications interface may also be configured to support communications at the network layer, possibly via Internet Protocol (IP).

In some cases, the apparatus 580 may be implemented in a chip or chip set. In an example embodiment, the chip or chip set may be programmed to perform one or more operations of one or more methods as described herein and may include, for instance, one or more processors 582, memory devices 584, and/or other circuitry components incorporated in one or more physical packages (for example, chips). By way of example, a physical package may include an arrangement of one or more materials, components, and/or wires on a structural assembly (for example, a baseboard) to provide one or more characteristics such as physical strength, conservation of size, and/or limitation of electrical interaction. It is contemplated that in certain embodiments the chip or chip set can be implemented in a single chip. It is further contemplated that in certain embodiments the chip or chip set can be implemented as a single "system on a chip." It is further contemplated that in certain embodiments a separate ASIC may not be used, for example, and that all relevant operations as disclosed herein may be performed by a processor or processors. A chip or chip set, or a portion thereof, may constitute a means for performing one or more operations of one or more methods as described herein.

Figure 6:
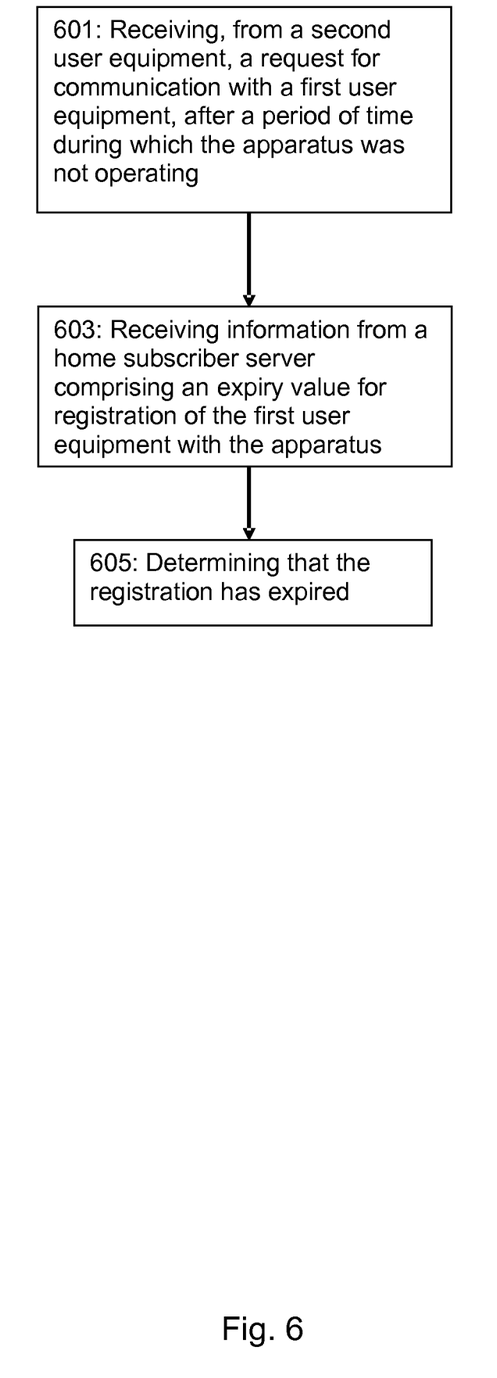
FIG. 6 schematically shows a flow chart of a method according to an example.

FIG. 6 is a flow chart of a method according to an example. The flow chart of FIG. 6 is viewed from the perspective of an apparatus such as an S-CSCF 308 or S-CSCF 408.

At 601, the apparatus receives a request for a communication with a first user equipment. In examples, the request is received from a second user equipment. In examples, the request is received after a period of time during which the apparatus is not operating.

At 603, the apparatus the apparatus receives information from a home subscriber server. In examples the information comprises an expiry value for registration of the first user equipment with the apparatus.

At 605, the apparatus determines that the registration of the user equipment with the apparatus has expired.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising at least one processor and at least one memory including computer program code, the at least one memory and the computer program code configured to, with the at least one processor, cause the apparatus at least to perform:
receiving a registration request from a first user equipment, wherein the registration request comprises an initial registration or a re-registration;

sending, in response to receipt of the registration request, a server assignment request message, comprising an expiry time and a timestamp, for the first user equipment to a home subscription server, wherein an expiry value and the timestamp are updated during the re-registration;

receiving, from a second user equipment, a request for communication with the first user equipment, after a period of time during which the apparatus was not operating;

receiving information from the home subscriber server comprising the expiry value for registration of the first user equipment with the apparatus; and determining that the registration has expired.

2. An apparatus according to claim 1, wherein determining that the registration has expired comprises comparing a current time with the expiry value and determining that the registration has expired when the current time is determined to be later than the expiry value.

3. An apparatus according to claim 1, wherein the server assignment request message comprises the expiry value.

4. An apparatus according to claim 1, wherein the server assignment request message is sent before the period of time during which the apparatus was not operating.

5. An apparatus according to claim 1, wherein the at least one memory and the computer program code are further configured to, with the at least one processor, cause the apparatus to:
provide a default service when it is determined that the registration has expired.

6. An apparatus according to claim 5, wherein the default service comprises forwarding communication data to a voice mail service or to a third user equipment.

7. An apparatus according to claim 5, wherein the default service comprises redirecting the requested communication to a circuit switched domain.

8. An apparatus according to claim 1, wherein the at least one memory and the computer program code are further configured to, with the at least one processor, cause the apparatus to:
receive, in response to determining that the registration has expired, a default profile from the home subscriber server.

9. A method comprising:
receiving a registration request from a first user equipment, wherein the registration request comprises an initial registration or a re-registration;
sending, in response to receipt of the registration request, a server assignment request message, comprising an expiry time and a timestamp, for the first user equipment to a home subscription server, wherein an expiry value and the timestamp are updated during the re-registration;
receiving, at an apparatus and from a second user equipment, a request for communication with the first user equipment, after a period of time during which the apparatus was not operating;
receiving information from the home subscriber server comprising the expiry value for registration of the first user equipment with the apparatus; and
determining that the registration has expired.

10. A method according to claim 9, wherein determining that the registration has expired comprises comparing a current time with the expiry value and determining that the registration has expired when the current time is determined to be later than the expiry value.

11. A method according to claim 9, wherein the server assignment request message comprises the expiry value.

12. A method according to claim 9, wherein the server assignment request message is sent before the period of time during which the apparatus was not operating.

13. A method according to claim 9, wherein the method comprises:
providing a default service when it is determined that the registration has expired.

14. A method according to claim 13, wherein providing the default service comprises forwarding communication data to a voice mail service or to a third user equipment.

15. A method according to claim 13, wherein providing the default service comprises redirecting the requested communication to a circuit switched domain.

16. A method according to claim 9, further comprising:
receiving, in response to determining that the registration has expired, a default profile from the home subscriber server.

17. A non-transitory computer readable medium comprising program instructions for causing an apparatus to perform at least the following:
receiving a registration request from a first user equipment, wherein the registration request comprises an initial registration or a re-registration;
sending, in response to receipt of the registration request, a server assignment request message, comprising an expiry time and a timestamp, for the first user equipment to a home subscription server, wherein an expiry value and the timestamp are updated during the re-registration;
receiving, from a second user equipment, a request for communication with the first user equipment, after a period of time during which the apparatus was not operating;
receiving information from the home subscriber server comprising the expiry value for registration of the first user equipment with the apparatus; and
determining that the registration has expired.

18. A non-transitory computer readable medium according to claim 17, wherein the program instructions for causing the apparatus to determine that the registration has expired comprise program instructions for causing the apparatus to compare a current time with the expiry value and to determine that the registration has expired when the current time is determined to be later than the expiry value.

19. A non-transitory computer readable medium according to claim 17, further comprising program instructions for cause the apparatus to perform:
receiving, in response to determining that the registration has expired, a default profile from the home subscriber server.

* * * * *